(12) United States Patent
Ke

(10) Patent No.: US 12,337,362 B2
(45) Date of Patent: Jun. 24, 2025

(54) OIL TANK CLEANING DEVICE

(71) Applicant: Shih-Yuan Ke, Hsin-gang Shiang (TW)

(72) Inventor: Shih-Yuan Ke, Hsin-gang Shiang (TW)

(*) Notice: Subject to any disclaimer, the term of this patent is extended or adjusted under 35 U.S.C. 154(b) by 312 days.

(21) Appl. No.: 18/100,945

(22) Filed: Jan. 24, 2023

(65) Prior Publication Data

US 2024/0157414 A1 May 16, 2024

(30) Foreign Application Priority Data

Nov. 15, 2022 (TW) ................................ 111143590

(51) Int. Cl.
*B08B 9/093* (2006.01)
*B01D 17/02* (2006.01)
*G05D 7/06* (2006.01)

(52) U.S. Cl.
CPC ........ *B08B 9/0933* (2013.01); *B01D 17/0217* (2013.01); *G05D 7/0652* (2013.01); *B08B 2209/08* (2013.01)

(58) Field of Classification Search
CPC ..... B01D 17/0217; B08B 9/08; B08B 9/0933; B08B 2209/08
See application file for complete search history.

(56) References Cited

U.S. PATENT DOCUMENTS 3,723,309 A * 3/1973 Garcia ...................... C02F 1/24
210/195.1

FOREIGN PATENT DOCUMENTS

| CN | 106746419 A | 5/2017 |
| CN | 106957136 A | 7/2017 |
| CN | 108275859 A | 7/2018 |
| TW | 107126568 A | 7/2018 |

* cited by examiner

*Primary Examiner* — David G Cormier
(74) *Attorney, Agent, or Firm* — FRESH IP PLC; Clifford D. Hyra; Aubrey Y. Chen

(57) ABSTRACT

An oil tank cleaning device is used to solve the problem of poor effect of conventional cleaning operation of an oil tank. The oil tank cleaning device includes a separation equipment, a temporary storage tank, a collecting tank, a pipeline unit, and a plurality of control valves. A first pump sucks air out of the temporary storage tank, such that the temporary storage tank is in a negative pressure state. The collecting tank receives a fluid outputted from the temporary storage tank. The pipeline unit includes a plurality of pipes for intercommunicating with an oil supply tank, a to-be-treated oil tank, the temporary storage tank, the separation equipment, and the collecting tank. Each of the plurality of pipes includes at least one of the plurality of control valves. Each control valve is configured to control flow of a liquid in the control valve.

10 Claims, 11 Drawing Sheets

OIL TANK CLEANING DEVICE

FIELD

The present disclosure relates to an oil tank cleaning device and, more particularly, to an oil cleaning device for removing oil sludge in an oil tank and cleaning the oil tank.

BACKGROUND

Due to safety considerations, a conventional oil tank used for storage fuel or crude oil must at least remove oil sludge in the oil tank and clean the oil tank each five years according to the oil tank safety regulations, so as to inspect safety of the oil tank structure. A conventional tank that stores refined oil or unrefined oil generally includes heavy oil, silt, and oil sludge.

Taking an oil tank of an oil refinery as an example, since the oil tank is a sealed space, when the oxygen concentration is lower than 18% vol (the volume of oxygen in the air is lower than 18%), a worker in the oil tank will suffer from hypoxia, which may cause an accident, such as death. Therefore, it is necessary to adopt a machinery equipment without the need of sending workers into the oil tank to proceed with removal of oil sludge and cleaning the oil tanks, etc.

Please refer to FIG. 1 illustrating a conventional machinery equipment 9 for carrying out a method of removing oil sludge. The conventional machinery equipment 9 includes an oil supply tank 91, a to-be-treated oil tank 92, and a temporary storage tank 93. The oil supply tank 91 receives heavy oil and light oil, and the light oil floats on the heavy oil. The oil supply tank 91 intercommunicates with the to-be-treated oil tank 92 via a delivery pipe 94a, the to-be-treated oil tank 92 intercommunicates with the temporary oil tank 93 via a delivery pipe 94b, and the temporary oil tank 93 intercommunicates with the oil supply tank 91 via a delivery pipe 94c, thereby substantially forming a loop.

The delivery pipe 94a includes a first switch valve 95a, first pump 96a, a heater 98, and a first non-return valve 97a. The first non-return valve 97 is located between the heater 98 and the oil supply tank 91. The delivery pipe 94b includes a second switch valve 95b disposed on a sidewall of the to-be-treated oil tank 92, a third switch valve 95c disposed on the sidewall of the to-be-treated oil tank 92, a fourth switch valve 95d disposed on the sidewall of the to-be-treated oil tank 92, a fifth switch valve 95e disposed on the sidewall of the to-be-treated oil tank 92, a sixth switch valve 95f, and a second non-return valve 97b. The deliver pipe 94c includes a seventh switch valve 95g, a second pump 96b, and a third non-return valve 97c. The seventh switch valve 95g and the second pump 96b are close to the temporary storage tank 93. The third non-return valve 97c is closer to the oil supply tank 91.

In use, the first, second, third, fourth, fifth, sixth, and seventh switch valves 95a-95g are firstly opened, such that the light oil at the upper portion of an interior of the oil supply tank 91 can be pumped out by the first pump 96a to serve as a laundry detergent carrier. The laundry detergent carrier flows through the delivery pipe 94a, the non-return valve 97a, and the heater 98 and is heated to about 60° C. to dissolve the oil sludge in the to-be-treated oil tank 92 and to reduce the viscosity of the oil sludge, such that the oil sludge can be easily carried out of the to-be-treated oil tank 92 by the laundry detergent carrier.

Furthermore, since a vacuum pump 96c is disposed on the temporary oil tank 93, a negative pressure can be formed in the interior of the temporary oil tank 93 by the vacuum pump 96c, such that the laundry detergent carrier and the oil sludge in the to-be-treated oil tank 92 can form a mixture (hereinafter "crude liquid") which flows through the delivery pipe 94b into the temporary oil tank 93. Then, the crude liquid is pumped out by the second pump 96b, flows through the third non-return valve 97c, and flows into and is stored in the oil supply tank 91 for refinement.

After many times of repeated circulation, when the oil sludge above the liquid level of the switch valves 95b, 95c, 95d, and 95e disposed on the sidewall of the to-be-treated oil tank 92 is removed, hot water can be sprayed to clean the inner wall of the to-be-treated oil tank 92 for safety inspection of the oil tank structure. Thus, the oil sludge, which is originally regarded as a waste and discarded, can be recycled and refined, which meets the concept of environmental protection while increasing the revenue, achieving several purposes at one stroke.

However, in the above method using the above conventional machinery equipment 9 to remove the oil sludge in the to-be-treated oil tank 92, the method can only move the oil sludge in the to-be-treated oil tank 92 into the oil supply tank 91 (at best only move the oil sludge) but cannot proceed with separation of the oil and sludge. As a result, the amount of oil sludge will be increased but cannot be reduced, which is not ideal.

Taiwan Patent No. 1765079 discloses a method for treating bottom sludge in a crude oil tank. The method includes six independently operable steps: (1) an oil sludge pretreatment step: the oil sludge is pretreated by filtration and homogenization, wherein stout solid matters, such as large rocks, screws, iron plates, etc., are filtered first, and the oil sludge is delivered into a preheating chamber for preheating, such that the oil sludge is in a fluid state; (2) a cyclone three-phase separation step: after the oil sludge pretreatment step, high-temperature steam is used as a scrubbing agent, wherein the oil sludge is scrubbed and heated in a cyclone chamber of a cyclone three-phase separation machine to dissolve and suspend hydrocarbons, to vaporize wastewater, and to volatile petroleum gas, thereby separating oil, water, solid waste, and petroleum gas; (3) a petroleum gas oxidation and combustion step: a thermal oxidation device is used to extract and collect the petroleum gas produced from the cyclone three-phase separation machine, and the petroleum gas is oxidized and combusted through thermal oxidation by a thermal oxidation combustion device connected to propane gas; (4) a liquid catalyst extraction step: after the cyclone three-phase separation step separating oil from water, porous structures and high-viscosity hydrocarbons contained in the residing solid waste undergo a microbubble extraction step cooperating with a liquid catalyst, wherein an impingement method is used to enable microbubbles having a diameter as small as 20 microns (0.02 mm) carrying the liquid catalyst to infiltrate the pores in the solid waste, thereby extracting all hydrocarbons and oil contents residing on the surface of the porous solid waste and in the pores of the porous solid waste; (5) a liquid catalyst recycling step: including a two-stage molecule distillation technique to recycle the liquid catalyst for reuse in the liquid catalyst extraction step by circulating supply, and the separated and recycled crude oil is free of the liquid catalyst; and (6) a wastewater treatment step: after the cyclone three-phase separation step, the wastewater produced from the cyclone three-phase separation machine is treated, wherein the wastewater treatment step includes a precision oil/water separation step, an active carbon absorption step, and an anion/cation exchange step, which are used to remove all hydrocarbons residing in the wastewater, and the discharged water can be recycled and reused.

However, in the method disclosed in the above patent, high-temperature steam of 135° C. is used as a scrubbing agent, wherein the oil sludge is scrubbed and heated in a cyclone chamber of a cyclone three-phase separation machine to dissolve and suspend hydrocarbons, to vaporize wastewater, and to volatilize petroleum gas, thereby separating oil, water, solid waste, and petroleum gas. After suction and collection of the petroleum gas produced from the cyclone three-stage separation machine, the petroleum gas is oxidized and combusted through thermal oxidation by a thermal oxidation combustion device connected to propane gas. This method requires a heating equipment to heat oily water to become overheated steam of 135° C. and a thermal oxidation combustion device connected to propane gas to oxidize and combust the petroleum gas produced from the cyclone three-phase separation machine. The structure for carrying out the above method is relatively complicated. Furthermore, heating the oily water to 135° C. will generate volatile organic compounds (VOCs) which is a toxic gas. This not only causes high operating costs but also causes risks of environmental pollution.

CN106746419A discloses a scaled pyrolysis treatment system for oily sludge including a feeding pre-separation unit for performing secondary screening and solid-liquid separation on the oily sludge; a drying pyrolysis unit for performing drying and pyrolysis reaction on the oily sludge; a dust removal and condensation unit for performing dust removal and condensation on a pyrolysis gas mixture generated by the drying pyrolysis unit; and a discharge treatment unit which receives and treats separated substances of the other units respectively. The scaled pyrolysis treatment system for oily sludge must include a heating boiler to generate a pyrolysis temperature of 180-200° C. and a combustion chamber with a gas combustor to treat toxic tail gas, which not only results in expensive operating costs but also causes risks of environmental pollution.

CN106957136A discloses a method for treating oily sludge including: heating and stirring the oily sludge, and performing solid-liquid separation after standing still, thereby obtaining a sludge and an oily liquid; passing the oily liquid into a sewage treatment system to separate oil and water, and extracting and purifying the separated oil; adding a chemical agent into the sludge to perform conditioning, and performing deep dehydration after conditioning, so as to obtain dehydrated sludge and filtrate, and the filtrate undergoes separation of oil and water again; and drying the dehydrated sludge and then performing pyrolytic carbonization. The method for treating oily sludge using pyrolysis requires heating the material in an anaerobic condition to a temperature above 500° C. to boil and vaporize the sludge. However, the water and oil in the sludge will have an azeotrope problem at this temperature, such that the produced wastewater will have a high ratio of oil content, and the recycled oil will have a high ratio of water content. Therefore, further recycling and treatment are required, or a plurality of recycling distillation structures must be added into the distillation tower section of the pyrolysis tower. As a result, the treatment equipment for performing the method for treating oily sludge becomes very complicated, and the operating costs are increased significantly.

CN108275859A discloses a continuous sludge environmental protection treatment technique, wherein the method for treating the oily sludge includes: performing pyrolysis of the sludge at a high temperature, including a first pyrolysis and a second pyrolysis, the absolute pressure of the first pyrolysis is 750-850 hPa, the temperature of the first pyrolysis is 100-150° C., the absolute pressure of the second pyrolysis is less than hPa, the temperature the second pyrolysis is 150-300° C., thereby obtaining pyrolysis waste and pyrolysis steam; placing the pyrolysis waste and the pyrolysis steam into a combustion chamber for a first combustion treatment; and after cooling the pyrolysis waste and the pyrolysis steam for 10 minutes, performing a second combustion treatment in the combustion chamber. Therefore, the method for treating oily sludge requires a heating equipment to generate the pyrolysis temperature of 100-300° C. and a combustion chamber for performing the first and second combustion treatments. The above method for treating oily sludge is complicated. Furthermore, heating the oily water to a temperature above 100° C. will generate toxic gas of volatile organic compounds, which not only results in expensive operating costs but also causes risks of environmental pollution.

SUMMARY

To solve the above problem, an objective of the present disclosure is to provide an oil tank cleaning device without requiring a person to enter an oil tank to proceed with cleaning operation, thereby avoiding accidents.

Another objective of the present disclosure is to provide an oil tank cleaning device which can reliably remove the oil sludge in the oil tank.

A further objective of the present disclosure is to provide an oil tank cleaning device which can proceed with separation treatment of the oil sludge in the oil tank to recycle treated clarified liquid, thereby meeting the concept of environmental protection while increasing the revenue.

Still another objective of the present disclosure is to provide an oil tank cleaning device which can avoid generation of toxic gas of volatile organic compounds and can reduce the operating costs.

When the terms "front", "rear", "left", "right", "up", "down", "top", "bottom", "inner", "outer", "side", and similar terms are used herein, it should be understood that these terms have reference only to the structure shown in the drawings as it would appear to a person viewing the drawings and are utilized only to facilitate describing the invention, rather than restricting the invention.

As used herein, the term "one" or "an" for describing the number of the elements and members of embodiments of the present disclosure is used for convenience, provides the general meaning of the scope of the present disclosure, and should be interpreted to include one or at least one. Furthermore, unless explicitly indicated otherwise, the concept of a single component also includes the case of plural components.

As used herein, the term "coupling", "join", "assembly", or similar terms is used to include separation of connected members without destroying the members after connection or inseparable connection of the members after connection. A person having ordinary skill in the art would be able to select according to desired demands in the material or assembly of the members to be connected.

Regarding the term "control valve" used herein, for ease of explanation, the description merely sets forth the control valve on the pipe through which the fluid and the carrier flow is open, whereas the rest control valves not on the path of the fluid and the carrier are closed, such that the fluid and the carrier will not flow through each of the closed control valve.

Regarding the term "one-way valve" used herein, for ease of explanation, the description merely sets forth the direction that the fluid and the carrier can pass is the forward flow direction, and the one-way valve can prevent reverse flow of the fluid and the carrier.

Regarding the terms "above the second control valve" and "below the second control valve" used herein, since the second control valve still has a distance of about 50 cm to the bottom of the oil tank, the level of the liquid received in the to-be-treated oil tank capable of flowing out of the second control valve is used as the standard, above the level is referred to as "above the second control valve", and below the level is referred to as "below the second control valve".

Regarding the term "separation device" used herein, Applicant has already filed a new Utility Patent application entitled "Multi-Stage Circulating Separation Equipment" with the United States Patent and Trademark Office on Jan. 17, 2023, and it has been assigned application Ser. No. 18/097,996. The present disclosure merely discloses the structure of the "separation equipment" without describing the rest to avoid redundancy. Furthermore, the whole technical contents disclosed in the patent application can be still deemed as a part of the present disclosure and can be cited.

An oil tank cleaning device according to the present disclosure comprises a separation equipment including a tank, a plurality of cyclones, a plurality of pressurizing pumps, and a pipeline module. The tank includes an upstream end and a downstream end. The tank includes an interior divided by a plurality of partitioning boards into a crude liquid chamber and a plurality of treatment liquid chambers. The crude liquid chamber and the plurality of treatment liquid chambers are arranged from the upstream end towards the downstream end. Each of the plurality of cyclones includes at least one discharge port and at least one return port. The discharge ports of the plurality of cyclones intercommunicate with the plurality of treatment liquid chambers, respectively. The pipeline module is connected to the tank, the plurality of cyclones, and the plurality of pressurizing pumps. A respective pressurizing pump closer to the upstream end pumps a fluid in the tank into an associated cyclone to urge a fluid with a relatively larger specific gravity to flow through the discharge port of the associated cyclone into an associated treatment liquid chamber. The fluid with the relatively larger specific gravity is pumped by a next pressurizing pump to a next cyclone, thereby successively delivering the fluid with the relatively larger specific gravity towards the downstream end. A fluid with a relatively smaller specific gravity flows through the return port of the associated cyclone towards the upstream end and into the tank for continuous circulation. The oil tank cleaning device further includes a temporary storage tank, a collecting tank, a pipeline unit, and at least one control valve. A first pump sucks air out of the temporary storage tank to maintain the temporary storage tank in a negative pressure state. The collecting tank is configured to receive a fluid outputted from the temporary storage tank. The pipeline unit includes a plurality of pipes for intercommunicating with an oil supply tank, a to-be-treated oil tank, the temporary storage tank, the separation equipment, and the collecting tank. Each of the plurality of pipes includes at least one of the plurality of control valves, and each control valve is configured to control flow of a liquid in the control valve.

Based on the above, the oil tank cleaning device according to the present disclosure can perform cleaning operation without requiring a person to enter the oil tank, thereby avoiding accidents. Furthermore, the oil tank cleaning device permits circulation of the carrier to repeatedly clean the to-be-treated oil tank by arrangement of the pipes, which can reliably remove the oil sludge in the oil tank. Furthermore, after separation treatment of the oil sludge, the treated clarified liquid can be recycled, which meets the concept of environmental protection, avoids waste of oil resource, and increases the revenue.

In an example, the collecting tank further includes a heater configured to heat the fluid flowing through the collecting tank. Therefore, the heater can be used to heat the laundry detergent carrier, such that the oil sludge in the to-be-treated oil tank can be dissolved and easily carried outward by the laundry detergent carrier.

In an example, the heating temperature of the heater is about 60° C. Therefore, generation of toxic gas of volatile organic compounds resulting from heating the mixture at a high temperature can be avoided, preventing environmental pollution.

In an example, the pipeline unit includes a first pipe for outputting a liquid in the oil supply tank; a second pipe connected to the to-be-treated oil tank and an input end of the connecting pipe of the separation equipment; a feeding pipe including an end connected between an input end of the connecting pipe and a switch valve on the connecting pipe and another end connected to the crude liquid chamber of the separation equipment; a third pipe connected to an outlet of the temporary storage tank and the oil supply tank; a fourth pipe connected to the third pipe (the first intercommunication) and an input end of the collecting tank, wherein an intermediate section of the fourth pipe is connected to the third pipe for a second intercommunication, such that a front fourth pipe is formed between the first intercommunication and the second intercommunication of the fourth pipe, and a rear fourth pipe is formed between the second intercommunication and the collecting tank; a fifth pipe connected to a first output end of the collecting tank for delivering the fluid to the to-be-treated oil tank; a discharge pipe having an end connected to a section of the connecting pipe between the switch valve and the one-way valve and another end connected to the first treatment liquid chamber; and a sixth pipe connected to a second output end of the collecting tank and the third pipe. Therefore, the pipeline unit enables the oil tank cleaning device according to the present disclosure to provide several cleaning effects.

In an example, the oil tank cleaning device further comprises a second pump disposed on the front fourth pipe, a third pump disposed on the fifth pipe, and a fourth pump disposed on the sixth pipe. Therefore, the plurality of pumps can be used to provide a sucking function, to pressurize the fluid to permit rapid flow, and to provide a better flushing effect.

In an example, the at least one control valve includes a first control valve disposed on the first pipe, at least one second control valve configured to control discharge of the liquid in the to-be-treated oil tank, the switch valve disposed on the connecting pipe, a third control valve disposed on the third pipe, a fourth control valve disposed on the front fourth pipe, a fifth control valve and a sixth control valve disposed on the rear fourth pipe, a seventh control valve disposed on the fifth pipe, a switch valve disposed on the discharge pipe, and an eighth control valve disposed on the sixth pipe. Therefore, each control valve can be used to control flow of the fluid, providing the oil tank cleaning device according to the present disclosure with several cleaning effects.

In an example, the output end of the first pipe is connected to the rear fourth pipe and is located between the fifth control valve and the sixth control valve. Therefore, the to-be-treated oil tank can be flushed by using the light oil inner the first pipe as a carrier.

In an example, the oil tank cleaning device further comprises a supply equipment. The pipeline unit further includes a seventh pipe connected to the first pipe and the supply equipment, and an eighth pipe connected to the seventh pipe and the fifth pipe. Therefore, the to-be-treated oil tank can be flushed by the carrier provided by the supply equipment.

In an example, the seventh pipe includes a ninth control valve and a tenth control valve. Therefore, when the laundry detergent carrier needs not to pass through the heater for heating or the collecting tank malfunctions, the seventh pipe, the ninth control valve, and the tenth control valve can be used to change the path of the carrier for flushing the to-be-treated oil tank.

In an example, an end of the eighth pipe is connected to a section of the fifth pipe between the seventh control valve and the third pump. Another end of the eighth pipe is connected to a section of the seventh pipe between the ninth control valve and the tenth control valve. Therefore, by providing the seventh pipe and the eighth pipe, the path of the carrier can be changed to flush the to-be-treated oil tank.

DETAILED DESCRIPTION

Figure 1:
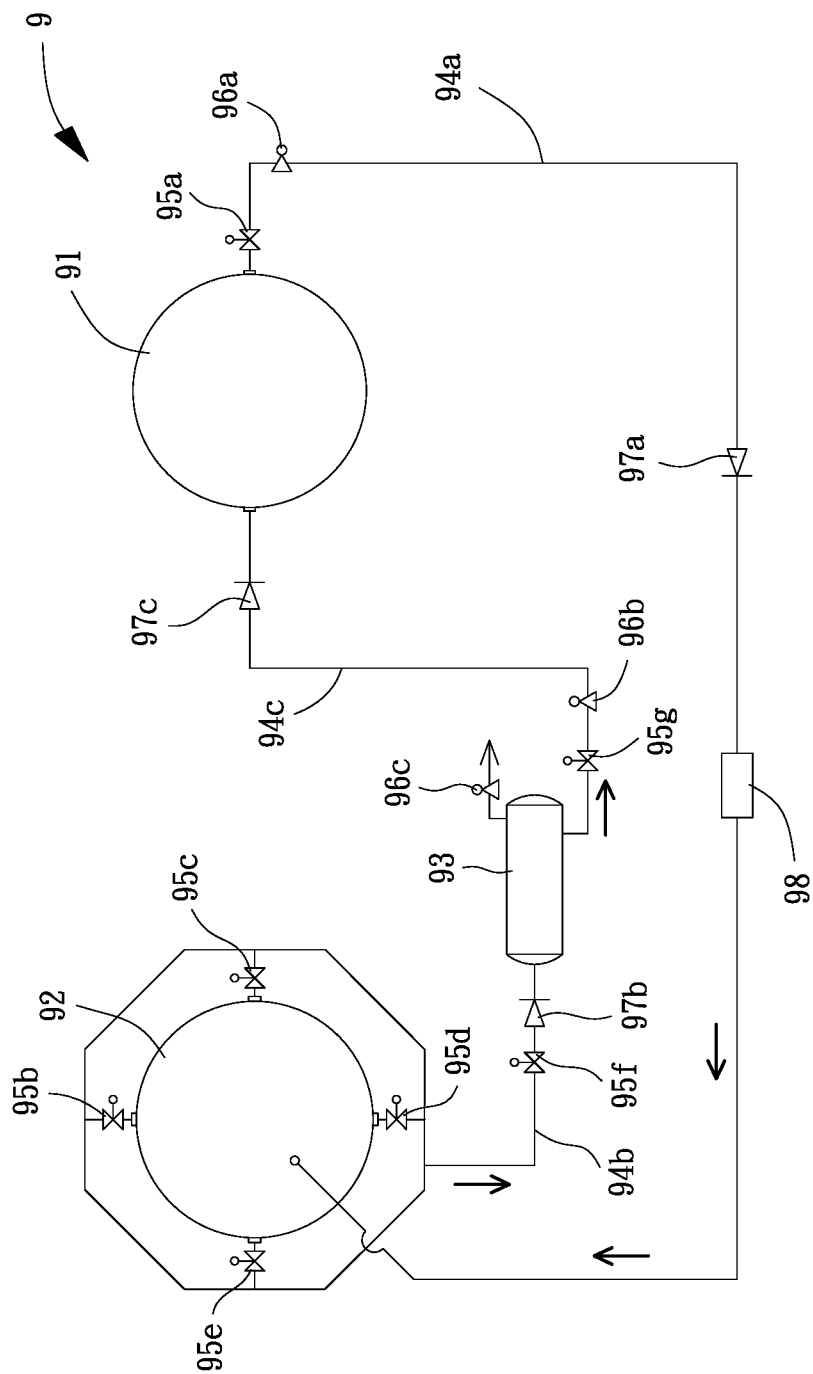
FIG. 1 is diagram illustrating a conventional machinery equipment for carrying out a method of removing oil sludge.

In order to make the above and other objectives, features, and advantages of the present invention clearer and easier to understand, preferred embodiments of the present invention will be described hereinafter in connection with the accompanying drawings. Furthermore, the elements designated by the same reference numeral in various figures will be deemed as identical, and the description thereof will be omitted.

Figure 2:
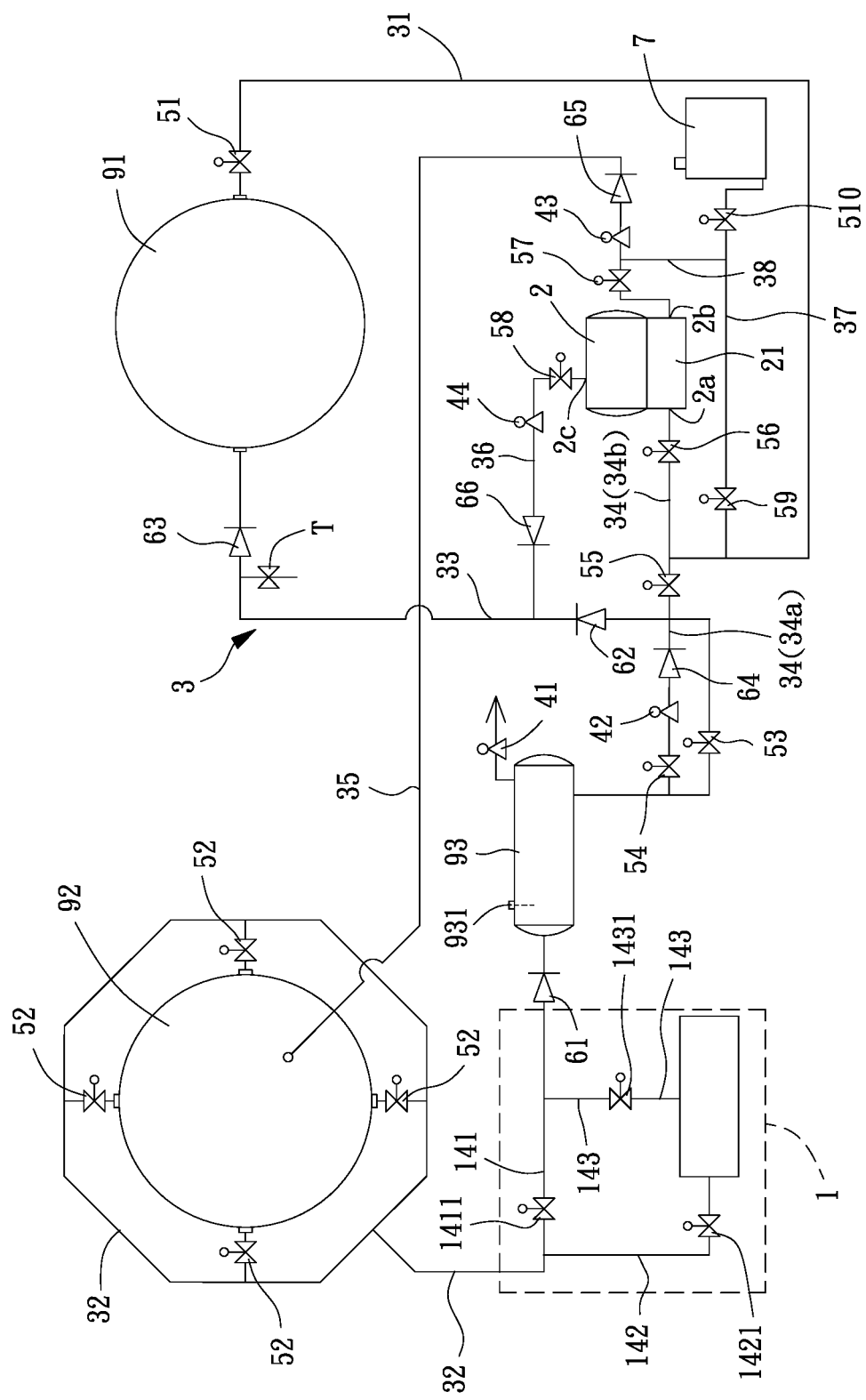
FIG. 2 is a diagram illustrating an oil tank cleaning device according to at least one embodiment of the present disclosure cooperating with a conventional machinery equipment.

Please refer to FIG. 2 illustrating an oil tank cleaning device according to the present disclosure cooperating with a conventional machinery equipment. The oil tank cleaning device includes a separation equipment 1, a collecting tank 2, a pipeline unit 3, and at least one control valve. The pipeline unit 3 is connected to the above associated components via a plurality of pipes to form a plurality of liquid passages. The at least one control valve is used to control flow of the liquid in each pipe.

The oil tank cleaning device according to the present disclosure cooperates with an oil supply tank 91, a to-be-treated oil tank 92, and a temporary storage tank 93 which are conventional. The oil supply tank 91 may receive heavy oil and light oil, and the light oil floats on the heavy oil. The to-be-treated oil tank 92 may be any conventional oil tank to be cleaned. The temporary storage tank 93 is used to receive a mixture of the laundry detergent carrier and the oil sludge in the to-be-treated oil tank 92 or clarified liquid obtained after separation treatment of the separation equipment 1, or to deliver the crude liquid or the clarified liquid to the oil supply tank 91 for storage and subsequent refinement, or to deliver the crude liquid or the clarified liquid to the collecting tank 2 and then to the to-be-treated oil tank 92 for flushing the to-be-treated oil tank 92. Preferably, the temporary storage tank 93 may include a sensor 931 which is in electrical connection with a controller (not shown) and which can be used to detect the liquid level in the temporary storage tank 93. When it is detected that there is no liquid in the temporary storage tank 93, the controller is activated to stop the whole oil tank cleaning device.

Figure 3:
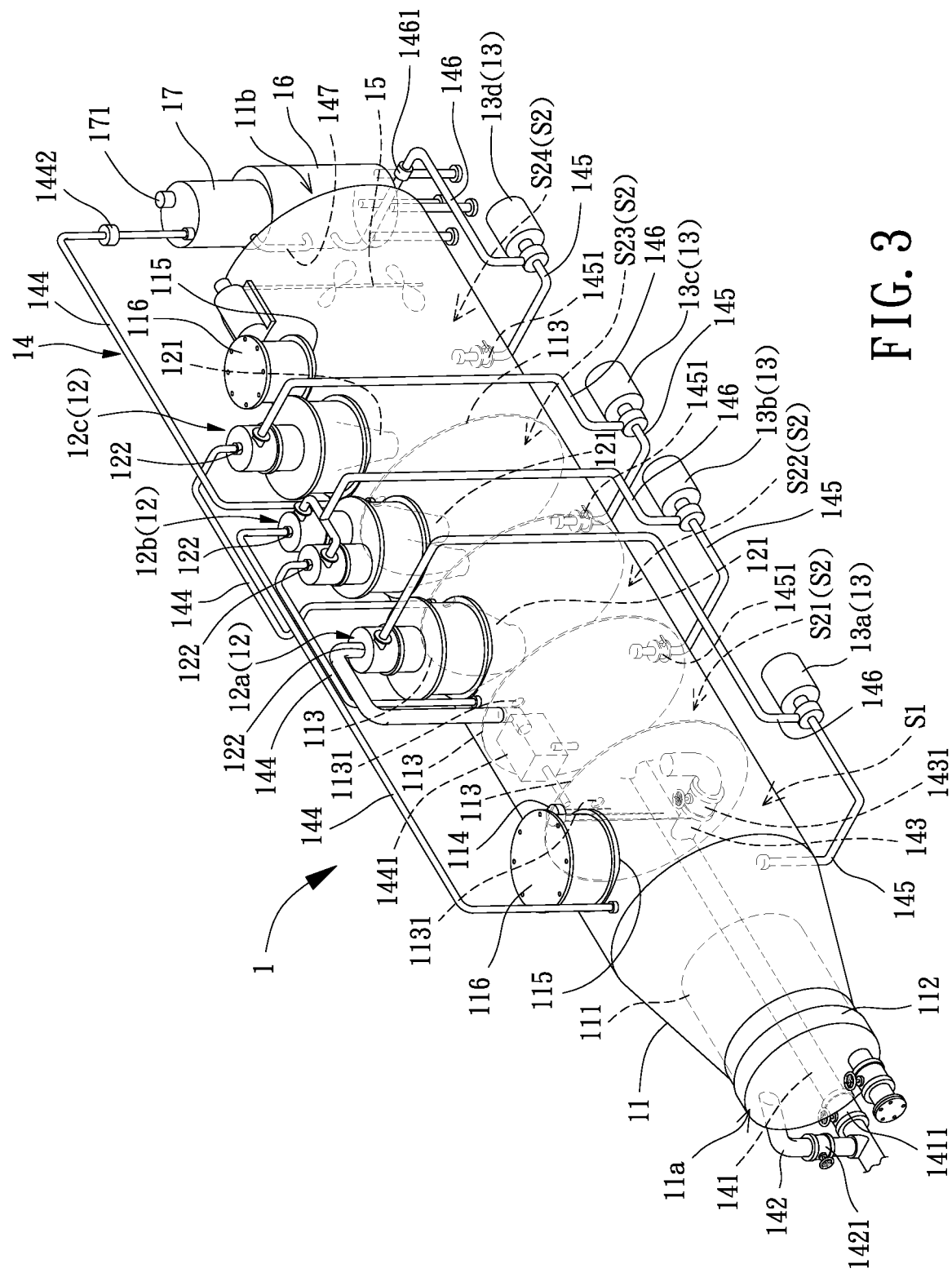
FIG. 3 is perspective view of a separation equipment of a preferred embodiment according to the present disclosure.
Figure 4:
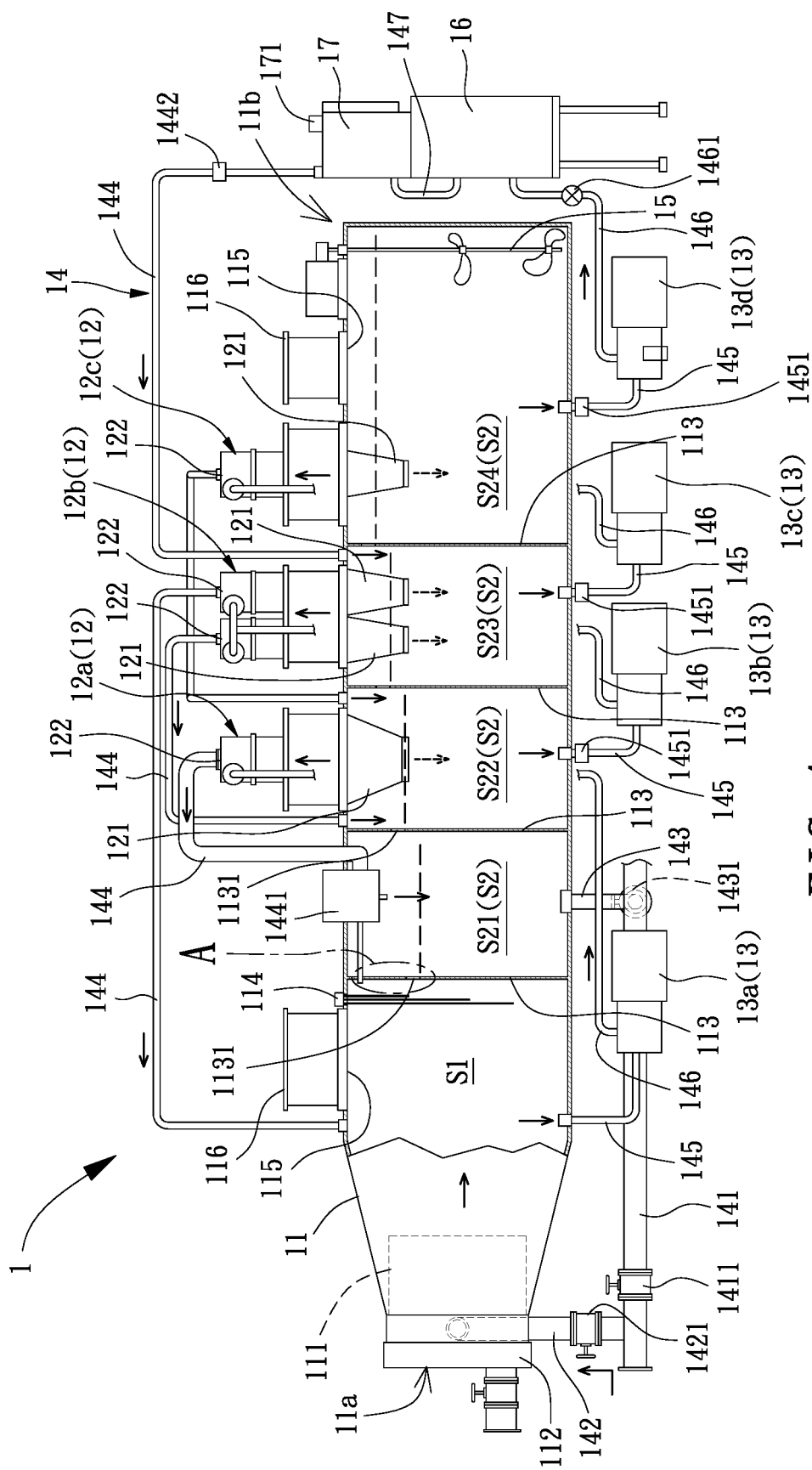
FIG. 4 is a diagram illustrating the structure of the separation equipment of the preferred embodiment according to the present disclosure.

With reference to FIGS. 3 and 4, a separation equipment 1 of a preferred embodiment according to the present disclosure comprises a tank 11, a plurality of cyclones 12, a plurality of pressurizing pumps 13, and a pipeline module 14. The pipeline module 14 is connected to the tank 11, the plurality of cyclones 12, and the plurality of pressurizing pumps 13.

The tank 11 includes an upstream end 11a and a downstream end 11b. The tank 11 can include a filter 111 disposed on the upstream end 11a to filter impurities flowing into the tank 11, avoiding damage. To permit easy cleaning of the filter 111, the tank 11 may include a cleaning opening 112.

An interior of the tank 11 is divided by a plurality of partitioning boards 113 into a crude liquid chamber S1 and a plurality of treatment liquid chambers S2. The crude liquid chamber S1 is closest to the upstream end 11a. The crude liquid chamber S1 and the plurality of treatment liquid chambers S2 are arranged from the upstream end 11a towards the downstream end 11b. In this embodiment, the number of the plurality of treatment liquid chambers S2 may be, but not limited to, four. Furthermore, for ease of explanation, the four treatment liquid chambers S2 are called first treatment liquid chamber S21, second treatment liquid chamber S22, third treatment liquid chamber S23, and fourth treatment liquid chamber S24 from the upstream end 11a towards the downstream end 11b (from left to right in the direction according to FIG. 4) in sequence.

With reference to FIGS. 3 and 4, each partitioning board 113 may include an overflow hole 1131. The overflow hole 1131 of one of each two adjacent partitioning boards 113 closer to the downstream end 11b is preferably higher than the overflow hole 1131 of another of the two adjacent portioning boards 113 closer to the upstream end 11a. Thus, when a level of a fluid in a treatment liquid chamber S2 closer to the downstream end 11b is too high, the fluid can overflow to another treatment liquid chamber S2 at the left side (according to the direction of FIG. 3) to avoid work safety accident resulting from overload of space. A treatment liquid chamber closer to the downstream end 11b than another treatment liquid chamber can accumulate more fluid than the another treatment liquid member. Furthermore, the tank 1 may further include a sensor 114. The sensor 114 is in electrical connection with a controller (not shown) and can be used to detect the liquid level of the crude liquid chamber S1.

The pipeline module 14 includes a connecting pipe 141 and a feeding pipe 142 intercommunicating with the connecting pipe 141 and the crude liquid chamber S1. The connecting pipe 141 includes a switch valve 1411 for controlling the fluid from an input end of the connecting pipe 141 to flow towards an output end of the connecting pipe 141 or to flow towards the feeding pipe 142. The feeding pipe 142 includes a switch valve 1421. When the switch valve 1411 of the connecting pipe 141 is closed and the switch valve 1421 of the feeding pipe 142 is opened, the feeding pipe 142 can guide the fluid to pass through the filter 111 and enter the crude liquid chamber S1. The pipeline module 14 further includes a discharge pipe 143 intercommunicating with the connecting pipe 141 and the first treatment liquid chamber S21. The discharge pipe 143 may include a switch valve 1431. Therefore, the fluid in the other treatment liquid chambers S2 (the second treatment liquid chamber S22, the third treatment liquid chamber S23, and the fourth treatment liquid chamber S24) can successively overflow into the first treatment liquid chamber S21 and can flow through the discharge pipe 143 into the connecting pipe 141 for discharge, rather than overflowing into the crude liquid chamber S1. Furthermore, the switch valve 1431 can prevent the fluid in the connecting pipe 141 from flowing reversely into the first treatment liquid chamber S21.

The tank 1 may further include a manhole 115 on a tank wall portion facing the crude liquid chamber S1 and another manhole 115 on another tank wall portion facing the fourth treatment liquid chamber S24 to permit a person to access or see the interior space in the crude liquid chamber S1 or the fourth treatment liquid chamber S24. Furthermore, each manhole 115 can be closed by a manhole cover 116.

Each of the plurality of cyclones 12 may include at least one discharge port 121 and at least one return port 122. The discharge ports 121 of the plurality of cyclones 12 intercommunicate with the plurality of treatment liquid chambers S2, respectively, such that after the fluid entering the cyclone 12 is separated by cyclone, a fluid with a relatively larger specific gravity is thrown out and sinks under the action of gravitational force to enter an associated treatment liquid chamber S2, whereas a fluid with a relatively smaller specific gravity can flow through the return port 122 towards the upstream end 11a and enter the tank 11 for continuous circulation.

In this embodiment, each of the plurality of cyclones 12 may be installed in the tank 11 and located on top of an associated treatment liquid chamber S2, such that the discharge port 121 can extend into the associated treatment liquid chamber S2, permitting precise input of fluid, whereas the return port 122 is exposed to the outside of the tank 11 for easy pipeline connection. Namely, the pipeline module 4 may include a plurality of return pipes 144. An end of each return pipe 144 may be connected to the return port 122 of an associated cyclone 12. Another end of each return pipe 144 may extend upward to intercommunicate with an associated treatment liquid chamber S2 or the crude liquid chamber S1.

As a non-limiting example, this embodiment may include three cyclones 12. Likewise, for ease of explanation, the three cyclones 12 are called first cyclone 12a, second cyclone 12b, third cyclone 12c from the upstream end 11a towards the downstream end 11b in sequence.

The discharge port 121 of the first cyclone 12a is aligned with the second treatment liquid chamber S22. Furthermore, a three-way valve 1441 is disposed on the return pipe 144 connected to the discharge port 122 of the first cyclone 12a, such that, by switching the three-way valve 1441, the return fluid can be controlled to flow into the crude liquid chamber S1 or the first treatment liquid chamber S21. Furthermore, in this embodiment, the second cyclone 12b may include two discharge ports 121 and two return ports 122. The two discharge ports 121 may be aligned with the third treatment liquid chamber S23. Furthermore, the diameter of each of the two discharge ports 121 of the second cyclone 12b may be smaller than the diameter of the discharge port 121 of the first cyclone 12a. One of the two return ports 122 of the second cyclone 12b intercommunicates with the crude liquid chamber S1 via a return pipe 144, and another of the two return ports 122 intercommunicates with the second treatment liquid chamber S22 via another return pipe 144. Furthermore, the discharge port 121 of the third cycle 12c may be aligned with the fourth treatment liquid chamber S24. The diameter of the discharge port 121 of the third cyclone 12c may also be smaller than the diameter of the discharge port 121 of the first cyclone 12a. The return port 122 of the third cyclone 12c may intercommunicate with the second treatment liquid chamber S22 via a return pipe 144.

The plurality of pressurizing pumps 13 is used to pump the fluid in the crude liquid chamber S1 or the treatment liquid chambers S2. The number of the pressurizing pumps 13 is at least the same as that of the cyclones 12. In tis embodiment, the number of the pressurizing pumps 13 may be four, and for ease of explanation, the four pressurizing pumps 13 are called, from the upstream end 11a towards the downstream end 11b in sequence, a first pressurizing pump 13a, a second pressurizing pump 13b, a third pressurizing pump 13c, and a fourth pressurizing pump 13d.

The first pressurizing pump 13a may intercommunicate with the crude liquid chamber S1 via a suction pipe 145 of the pipeline module 14 and may intercommunicate with the first cyclone 12a via a delivery pipe 146 of the pipeline module 14. Thus, by operation of the first pressurizing pump 13a, the fluid in the crude liquid chamber S1 can be pumped to the first cyclone 12a for a first-stage cyclone separation treatment. Likewise, the second pressurizing pump 13b may intercommunicate with the second treatment liquid chamber S22 via another suction pipe 145 and may intercommunicate with the second cyclone 12b via another delivery pipe 146. Thus, by operation of the second pressurizing pump 13b, the fluid in the second treatment liquid chamber S22 can be pumped to the second cyclone 12b for a second-stage cyclone separation treatment. The third pressurizing pump 13c may intercommunicate with the third treatment liquid chamber S23 via a further suction pipe 145 and may intercommunicate with the third cyclone 12c via a further delivery pipe 146. Thus, by operation of the third pressurizing pump 13c, the fluid in the third treatment liquid chamber S23 can be pumped to the third cyclone 12c for a third-stage cyclone separation treatment. Preferably, each of the suction pipe 145 connected to the second pressurizing pump 13b and the suction pipe 145 connected to the third pressurizing pump 13c includes a switch valve 1451 to control output.

Furthermore, since each partitioning board 113 has the overflow hole 1131, when the first pressurizing pump 13a malfunctions, even if the fluid in the crude liquid chamber S1 cannot be pumped to the first cyclone 12a, the fluid in the crude liquid chamber S1 can overflow into the first treatment liquid chamber S21 when the fluid reaches the height of the overflow hole 1131. Furthermore, by the design of the height difference of adjacent overflow holes 1131, when the second pressurizing pump 13b and/or the third pressurizing pump 13c malfunctions and, thus, cannot pump the fluid towards the downstream end 11b, the fluid (which is not expectedly separated by cyclone) will not overflow towards the downstream end 11b but will successively overflow towards the upstream end 11a and finally overflows into the treatment liquid chamber S2 (the first treatment liquid chamber S21) closest to the crude liquid chamber S1 and then flows through the discharge port 143 into the connecting pipe 141 for discharge, rather than overflowing into the crude liquid chamber S1.

Preferably, the separation equipment of this embodiment may further include a stirrer 15, a solid-liquid separator 16, and a liquid collecting tank 17. The stirrer 15 may be installed in the tank 11 to stir the fluid in the fourth treatment liquid chamber S24 for homogenization. The fourth pressurizing pump 13d may intercommunicate with the fourth treatment liquid chamber S24 via a suction pipe 145 of the pipeline module 114. Preferably, a switch valve 1451 is disposed on the suction pipe 145 to control output. The fourth pressurizing pump 13d may intercommunicate with the solid-liquid separator 16 via a delivery pipe 146 of the pipeline module 14, and a non-return valve 1461 may be disposed on the delivery pipe 146. By operation of the fourth pressurizing pump 13d, the fluid in the fourth treatment liquid chamber S24 is pumped into the solid-liquid separator 16 for dehydration to separate liquid from solid. As a non-limiting example, the solid-liquid separator 16 may be a product of NORITAKE CO., LIMITED). The solid matters (such as dirt, etc.) after solid-liquid separation can be scraped by a scrapper in the solid-liquid separator 16 and can fall from the bottom of the solid-liquid separator 16. The solid-liquid separator 16 may use a liquid delivery pipe 147 to deliver a liquid obtained after solid-liquid separation into the liquid collecting tank 17 in a normal pressure state. The liquid collecting tank 17 may include a sensor 171 in electrical connection with the controller and can be used to detect the level in the liquid collecting tank 17. Furthermore, the liquid collecting tank 17 may use a return pipe 144 of the pipeline module 14 to intercommunicate with the third treatment liquid chamber S23, and a switch valve 1442 may be disposed on the return pipe 144.

The input end of the connecting pipe 141 of the separation equipment 1 may be connected to the to-be-treated oil tank 92 via a second pipe 32 (as shown in FIG. 2), and the output end of the connecting pipe 141 of the separation equipment 1 is connected to the temporary storage tank 93. The air in the temporary storage tank 93 can be sucked out by the first pump 41 to maintain a negative pressure state in the temporary storage tank 93. After treatment by the separation equipment 1, the solid substances in the oil sludge in the to-be-treated oil tank 92 can be reliably separated, and the clarified liquid enters the temporary storage tank 93.

With reference to FIG. 2, the collecting tank 2 is used to receive the mixture or clarified liquid from the temporary storage tank 93. The mixture is formed of the laundry detergent carrier and the oil sludge in the to-be-treated oil tank 92. The clarified liquid is the clarified liquid which has been treated by the separation equipment 1. The mixture or the clarified liquid can enter via an input end 2a of the collecting tank 2 and can exit via a first output end 2b or a second output end 2c of the collecting tank 2 to serve as the laundry detergent carrier. Preferably, the collecting tank 2 may further include a heater 21 configured to heat the laundry detergent carrier. The heating temperature of the heater 21 is preferably about 60° C., such that the oil sludge in the to-be-treated oil tank 92 can be dissolved and can be easily carried outward by the laundry detergent carrier like running water.

With reference to FIG. 2, the pipeline unit 3 includes a first pipe 31 for outputting a liquid in the oil supply tank 91; a second pipe 32 connected to the to-be-treated oil tank 92 and an input end of the connecting pipe 141 of the separation equipment 1; a feeding pipe 142 including an end connected between the input end of the connecting pipe 141 and a switch valve 1411 on the connecting pipe 141 and another end connected to the crude liquid chamber S1 of the separation equipment 1; a third pipe 33 connected to an outlet of the temporary storage tank 93 and the oil supply tank 91; a fourth pipe 34 connected to the third pipe 33 (the first intercommunication) and an input end 2a of the collecting tank 2, wherein an intermediate section of the fourth pipe 34 is connected to the third pipe 33 for a second intercommunication, such that a front fourth pipe 34a is formed between the first intercommunication and the second intercommunication of the fourth pipe 34, and a rear fourth pipe 34b is formed between the second intercommunication and the collecting tank 2; a fifth pipe 35 connected to the first output end 2b of the collecting tank 2 for delivering the fluid to the to-be-treated oil tank 92; a discharge pipe 143 having an end connected to a section of the connecting pipe 141 between the switch valve 1411 and the one-way valve 61 and another end connected to the first treatment liquid chamber S21; and a sixth pipe 36 connected to the second output end 2c of the collecting tank 2 and the third pipe 33. Furthermore, the output end of the first pipe 31 is connected to the rear fourth pipe 34b and is located between the fifth control valve 55 and the sixth control valve 56, which will be explained hereinafter.

With reference to FIG. 2, preferably, the oil tank cleaning device according to the present disclosure may further include at least one pump for pumping air or liquid, such that the fluid in the pipeline unit 3 can be pressurized or can flow rapidly. The at least one pump may include a first pump 41 for sucking air in the temporary storage tank 93, a second pump 42 disposed on the front fourth pipe 34a, a third pump 43 disposed on the fifth pipe 35, and a fourth pump 44 disposed on the sixth pipe 36.

With reference to FIG. 2, the pipeline unit 3 may further include at least one control valve for controlling flow of the liquid in each pipe. The at least one control valve includes a first control valve 51 disposed on the first pipe 31, at least one second control valve 52 configured to control discharge of the liquid in the to-be-treated oil tank 92, the switch valve 1411 disposed on the connecting pipe 141, a third control valve 53 disposed on the third pipe 33, a fourth control valve 54 disposed on the front fourth pipe 34a, a fifth control valve 55 and a sixth control valve 56 disposed on the rear fourth pipe 34b, a seventh control valve 57 disposed on the fifth pipe 35, a switch valve 1431 disposed on the discharge pipe 143, and an eighth control valve 58 disposed on the sixth pipe 36.

With reference to FIG. 2, preferably, the oil tank cleaning device according to the present disclosure may further include a supply equipment 7. The supply equipment 7 may be a storage tank for storing and suppling a carrier, such as water, diesel fuel, detergent, etc. Alternatively, the supply equipment 7 may be a pipe for supplying a carrier, such as water, diesel fuel, detergent, etc. The pipeline unit 3 may further include a seventh pipe 37 connected to the first pipe 31 and the supply equipment 7, and an eighth pipe 38 connected to the seventh pipe 37 and the fifth pipe 35. The seventh pipe 37 may include a ninth control valve 59 and a tenth control valve 510. It is noted that an end of the first pipe 31 is connected to the oil supply tank 91, and another end of the first pipe 31 is connected to the rear fourth pipe 34b. Furthermore, an end of the eighth pipe 38 is connected to a section of the fifth pipe 35 between the seventh control valve 57 and the third pump 43, and another end of the eighth pipe 38 is connected to a section of the seventh pipe 37 between the ninth control valve 59 and the tenth control valve 510.

With reference to FIG. 2, the pipeline unit 3 may further include at least one one-way valve used to control the liquid in each pipe to flow in a single direction. The at least one one-way valve includes a first one-way valve 61 disposed on the connecting pipe 141 and adjacent to the temporary storage tank 93, a second one-way valve 62 and a third one-way valve 63 disposed on the third pipe 33, a fourth one-way valve 64 disposed on the fourth pipe 34, a fifth one-way valve 65 disposed on the fifth pipe 35, and a sixth one-way valve 66 disposed on the sixth pipe 36.

The to-be-treated oil tank 92 of the present disclosure may have any shape or may be a conventional oil tank. In this embodiment, the to-be-treated oil tank 92 may be a conventional cylindrical oil tank. Since the volume of the to-be-treated oil tank 92 is relatively large, the to-be-treated oil tank 92 has four second control valves 52 disposed around a periphery of the to-be-treated oil tank 92. The to-be-treated oil tank 92 may be flushed by section, such that the mixture after flushing/dissolving may be carried outward via an adjacent second control valve 52. Examples of non-restrictive cleaning methods will be set forth hereinafter.

Figure 5:
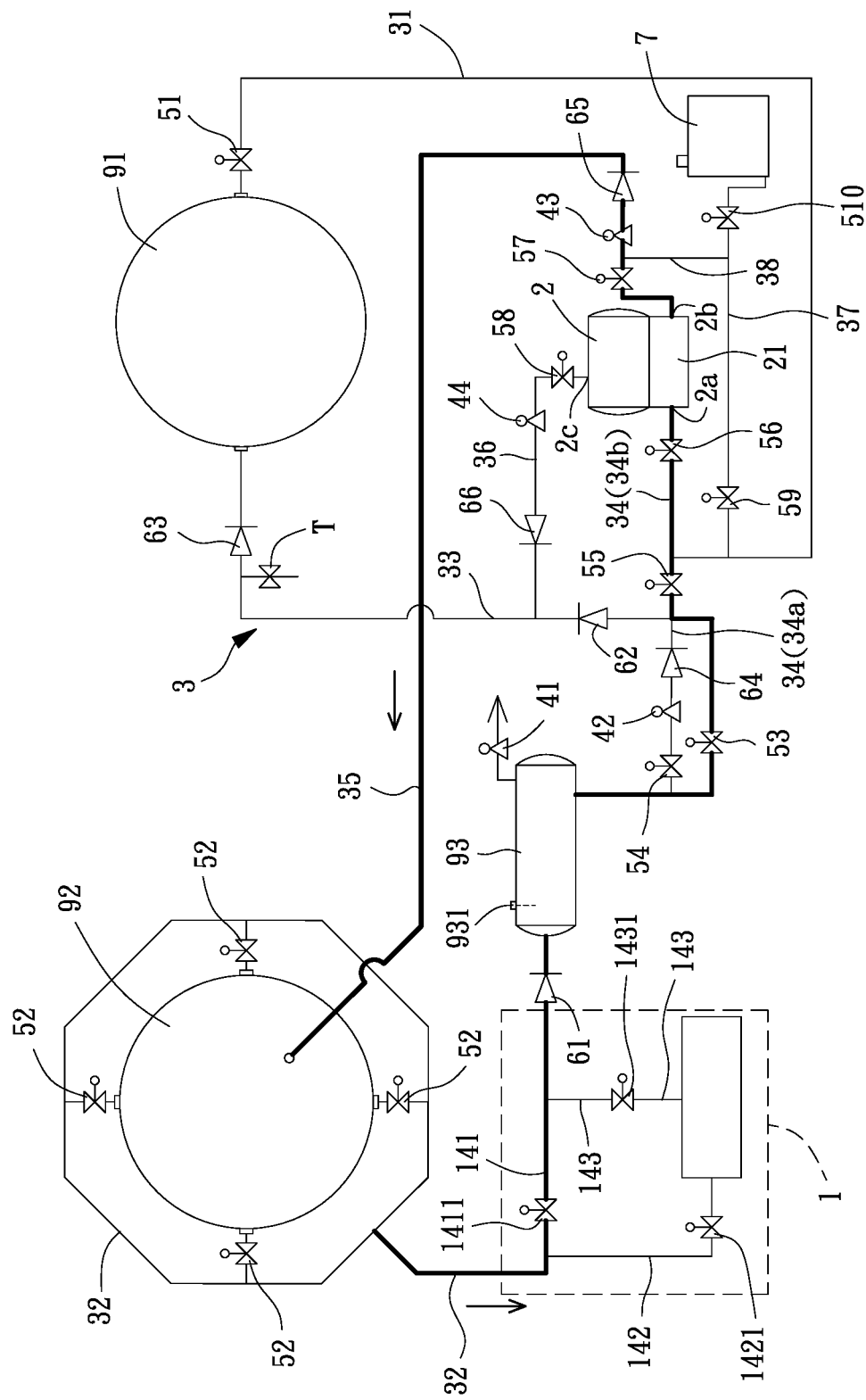
FIG. 5 is a schematic diagram illustrating the first kind of cleaning operation of the equipment shown in FIG. 2.

With reference to FIG. 5, when light oil is stored in the to-be-treated oil tank 92, the light oil can be used as the laundry detergent carrier, such that the light oil mixes with the oil sludge in the to-be-treated oil tank 92 to form a homogenous matter. Since the air in the temporary storage tank 93 can be sucked out by the first pump 41 to maintain a negative pressure state, the light oil can flow out of the opened second control valve 52 to flow through the second control valve 52, the second pipe 32, the connecting pipe 141, the switch valve 1411, and the first one-way valve 61 and enters the temporary storage tank 93. Then, since the light oil will not enter the oil supply tank 91 under the sucking action of the third pump 43, the light oil flows through the third pipe 33 and passes through the third control valve 53, the fifth and sixth control valves 55 and 56 on the rear fourth pipe 34b, and enters the collecting tank 2 via the input end 2a. If necessary, the heater 21 can be activated to heat the laundry detergent carrier, and the heating temperature is preferably about 60° C., such that the oil sludge in the to-be-treated oil tank 92 can be easily dissolved and can be easily carried outward by the laundry detergent carrier like running water. The laundry detergent carrier flows out of the first output end 2b of the collecting tank 2 and flows along the fifth pipe 35 to pass through the seventh control valve 57, the third pump 43, and the fifth one-way valve 65 and is sprayed inwards from a top portion of the to-be-treated oil tank 92 via a spraying head at the output end of the fifth pipe 35, thereby strongly flushing/dissolving the oil sludge in the to-be-treated oil tank 92. Therefore, repeated processing permits the light oil and the oil sludge in the to-be-treated oil tank 92 become homogenous via heating and flushing/dissolving. When the sensor 931 detects that no liquid is present in the interior of the temporary storage tank 93, a controller (not shown) will be activated to stop the whole oil tank cleaning device for processing inflow.

Figure 6:
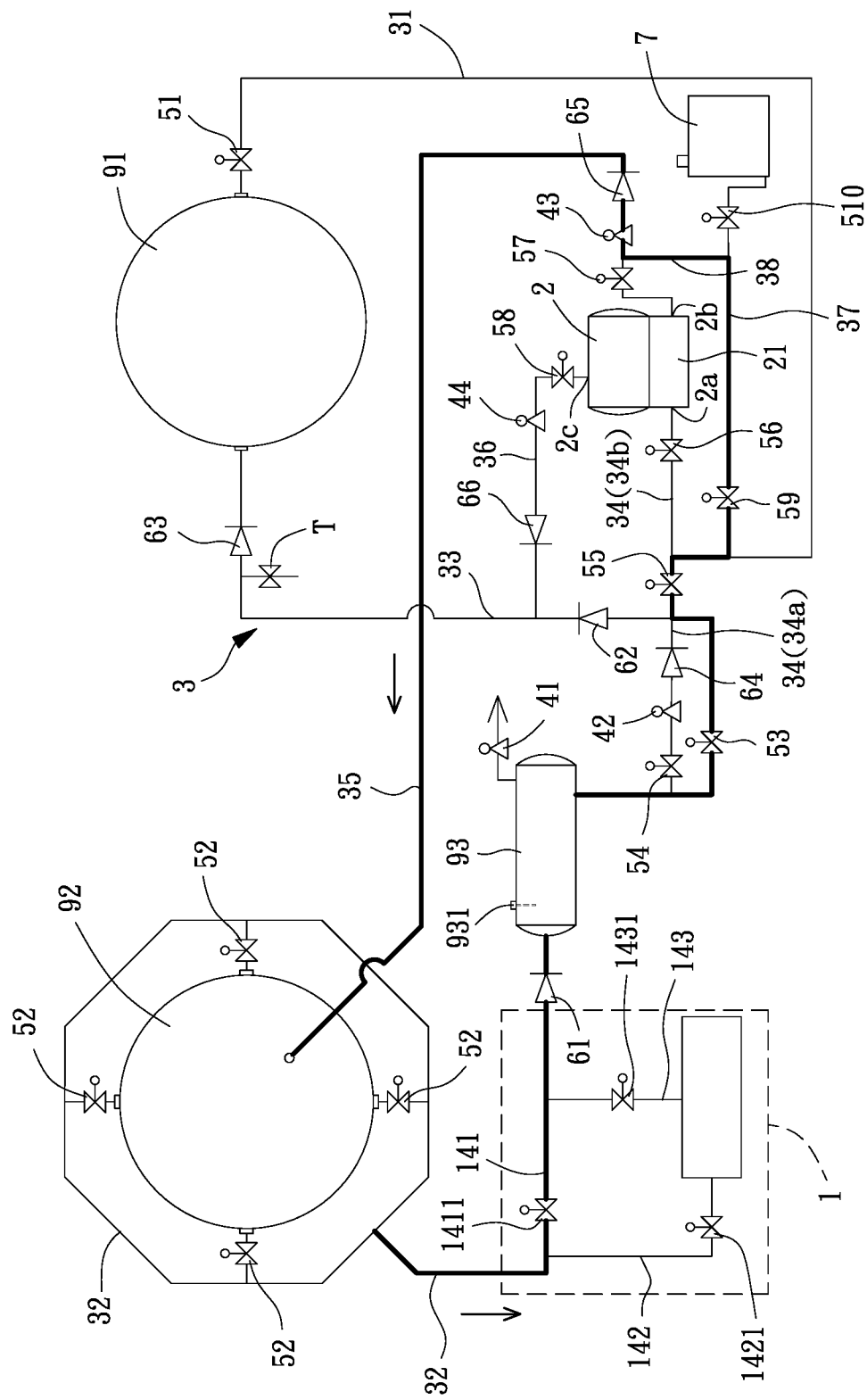
FIG. 6 is a schematic diagram illustrating the second kind of cleaning operation of the equipment shown in FIG. 2.

With reference to FIG. 6, when the laundry detergent carrier needs not to be heated by the heater 21 or the collecting tank 2 malfunctions, the sixth control valve 56 and the seventh control valve 57 can be closed, such that the mixture entering the rear fourth pipe 34b can pass through the ninth control valve 59 on the seventh pipe 37 and the eighth pipe 38 and enter the fifth pipe 35. Under the suction and pressurization by the third pump 43, the laundry detergent carrier can pass through the fifth one-way valve 65 and can be sprayed via the spraying head at the output end of the fifth pipe 35, thereby strongly flushing/dissolving the oil sludge in the to-be-treated oil tank 92.

Figure 7:
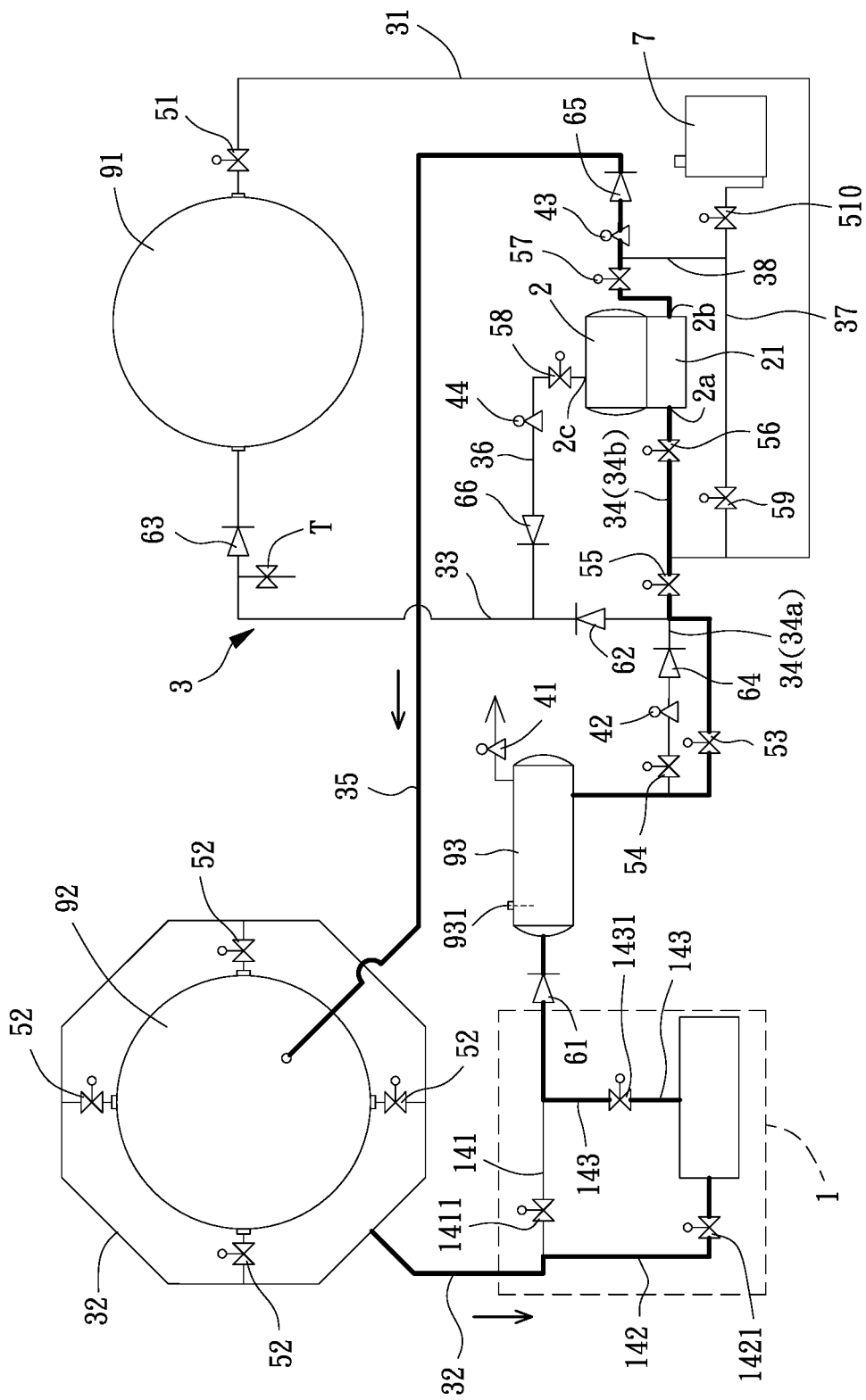
FIG. 7 is a schematic diagram illustrating the third kind of cleaning operation of the equipment shown in FIG. 2.

With reference to FIG. 7, when light oil is received in the to-be-treated oil tank 92, the light oil in the to-be-treated oil tank 92 can be used as the laundry detergent carrier to clean the oil sludge accumulated above each second control valve 52. The oil sludge mixture flushed/dissolved and carried by the light oil can undergo multi-stage circulating separation treatment in the separation equipment 1 (in the rectangle represented by dashed lines). Namely, the oil sludge mixture is carried outward from an adjacent second control valve 52 and enters the second pipe 32, and the switch valve 1411 is closed, such that the oil sludge mixture can pass through the feeding pipe 142 and the switch valve 1421 and enter the separation equipment 1 for multi-stage circulating separation treatment. After cyclone separation treatment of the oil sludge mixture, the solid matters after separation can fall from the bottom. The clarified liquid after separation passes through the discharge pipe 143, the switch valve 1431, the connecting pipe 141, and the first one-way valve 61 and enters the temporary storage tank 93. Then, since the fourth control valve 54 and the second pump 42 are closed and due to the reverse flow prevention function of the fourth one-way valve 64 and the suction action of the third pump 43, the clarified liquid passes through the third pipe 33, the third control valve 53, the rear fourth pipe 34b, the fifth control valve 55, the sixth control valve 56, the collecting tank 2, the seventh control valve 57, and the fifth one-way valve 65 and is strongly sprayed outward by the spraying head at the output end of the fifth pipe 35, thereby flushing/dissolving the oil sludge above the second control valve 52 in the to-be-treated oil tank 92.

Figure 8:
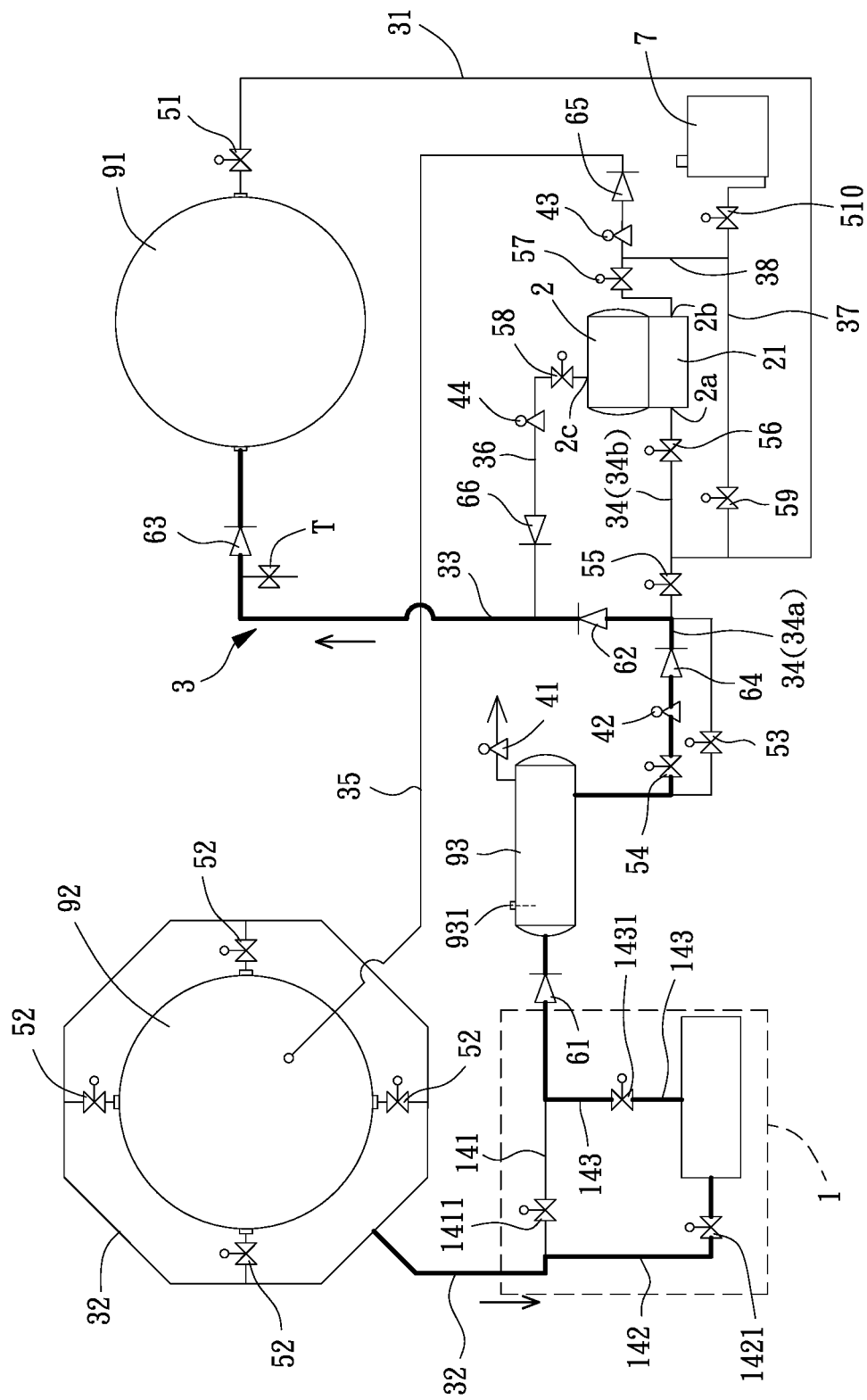
FIG. 8 is a schematic diagram illustrating the fourth kind of cleaning operation of the equipment shown in FIG. 2.

With reference to FIG. 8, the clarified liquid after the multi-stage circulating separation treatment by the separation equipment 1 can be recycled. Specifically, the oil sludge mixture is carried outward by an adjacent second control valve 52 and enters the second pipe 32, and the switch valve 1411, the third control valve 53, and the fifth control valve 55 are closed, such that the clarified liquid passes through the connecting pipe 141, and the switch valve 1421 of the feeding pipe 142 and then enters the separation equipment 1 for separation treatment. Next, the clarified liquid undergoes the cyclone separation treatment again, and the solid matters after separation fall from the bottom. The clarified liquid after separation passes through the discharge pipe 143, the switch valve 1431, the connecting pipe 141 and the first one-way valve 61 and enters the temporary storage tank 93. Due to the suction action of the second pump 42, the clarified liquid passes through the front fourth pipe 34a, the fourth control valve 54, the second pump 42, the fourth one-way valve 64, the second one-way valve 62, an inspection valve T for inspecting the clarified liquid, and the third one-way valve 63 and enters the oil supply tank 91. Therefore, the treated clarified liquid can be recycled, which meets the concept of environmental protection while increasing the revenue.

Figure 9:
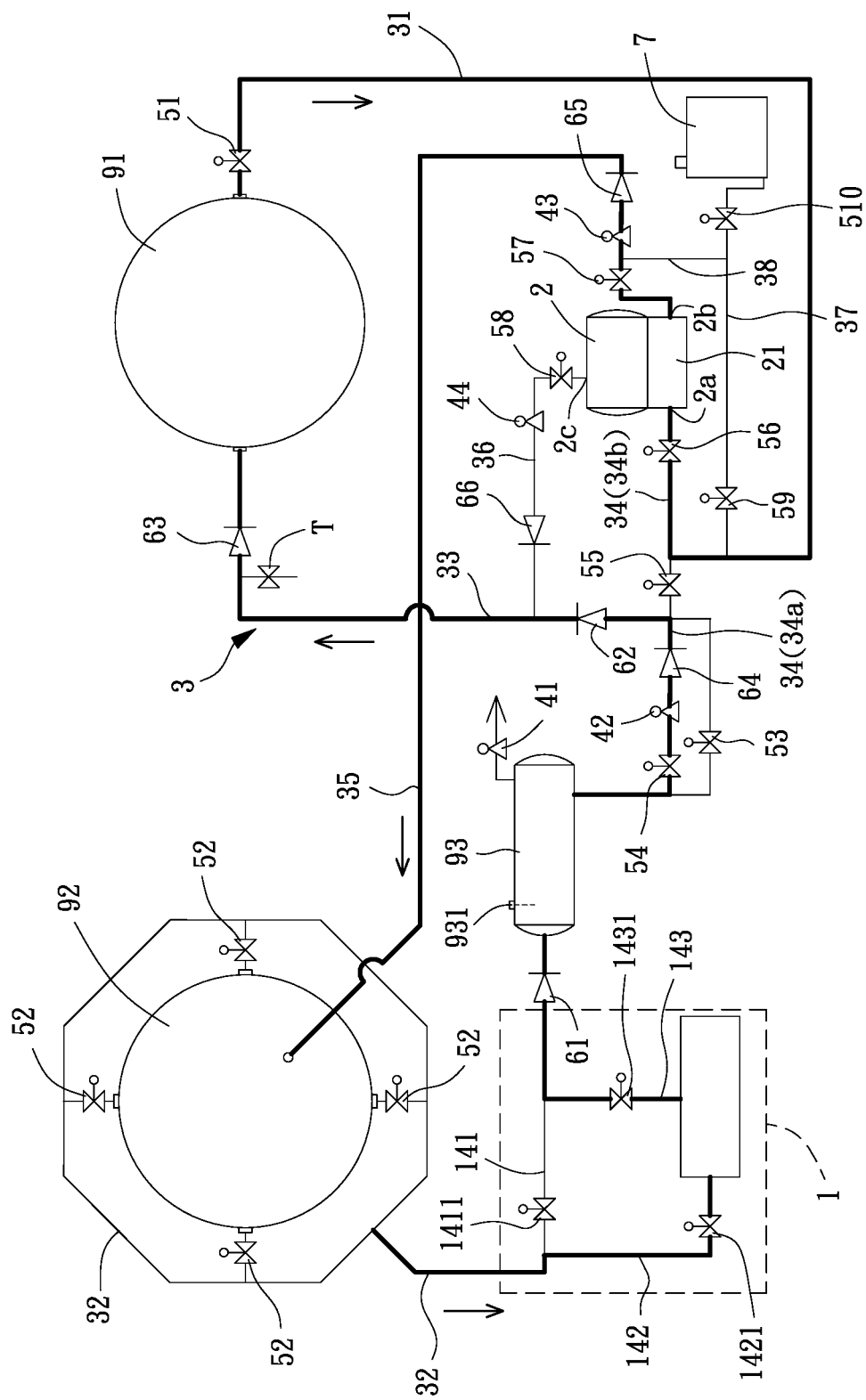
FIG. 9 is a schematic diagram illustrating the fifth kind of cleaning operation of the equipment shown in FIG. 2.

With reference to FIG. 9, when the to-be-treated oil tank 92 is an oil tank receiving a fuel, the light oil at the upper end of an interior of the oil supply tank 91 can be used as the laundry detergent for flushing the oil sludge in the to-be-treated oil tank 92. The light oil passes through the first pipe 31, the first control valve 51, and the rear fourth pipe 34*b*. Since the fifth control valve 55 and the ninth control valve 59 are closed, the light oil enters the collecting tank 2 via the sixth control valve 56. If necessary, the heater 21 can be activated, and the heated fluid passes through the fifth pipe 35 and the seventh control valve 57 and is pressurized by the third pump 43 to pass through the fifth one-way valve 65 and is then strongly sprayed outward by the spraying end at the output end of the fifth pipe 35, thereby flushing/dissolving the oil sludge in the to-be-treated oil tank 92. The light oil is used as a carrier, and the carried oil sludge mixture is carried outward via an adjacent second control valve 52 and enters the second pipe 32. Furthermore, since the switch valve 1411 is closed, the oil sludge mixture passes through the feeding pipe 142 and the switch valve 1421 and then enters the separation equipment 1 for multi-stage circulating separation treatment. After the clarified liquid undergoes the cyclone separation treatment, the solid matters after separation fall from the bottom. The clarified liquid after separation passes through the discharge pipe 143, the switch valve 1431, the connecting pipe 141 and the first one-way valve 61 and enters the temporary storage tank 93. Then, the clarified liquid passes through the front fourth pipe 34*a* and the fourth control valve 54, is subjected to the suction action and pressurization by the second pump 42, passes through the fourth one-way valve 64, the second one-way valve 62, and the inspection valve T, and enters the oil supply tank 91.

When the to-be-treated oil tank 92 is an oil tank receiving crude oil, since the oil sludge in the oil tank receiving crude oil is very viscous and, thus, has poor fluidity, the cleaning operation of the oil sludge above the second control valve 52 must be separated into three steps. The first step is supplying light oil (such as diesel fuel) into the to-be-treated oil tank 92. The second step is flushing/dissolving, immersing, and heating the oil sludge in the to-be-treated oil tank 92 and mixing the oil sludge with the diesel fuel to form a homogenous substance, thereby becoming a mixture with a good fluidity. The third step is entering the mixture into the separation equipment 1 for multi-stage circulating separation treatment.

Figure 10:
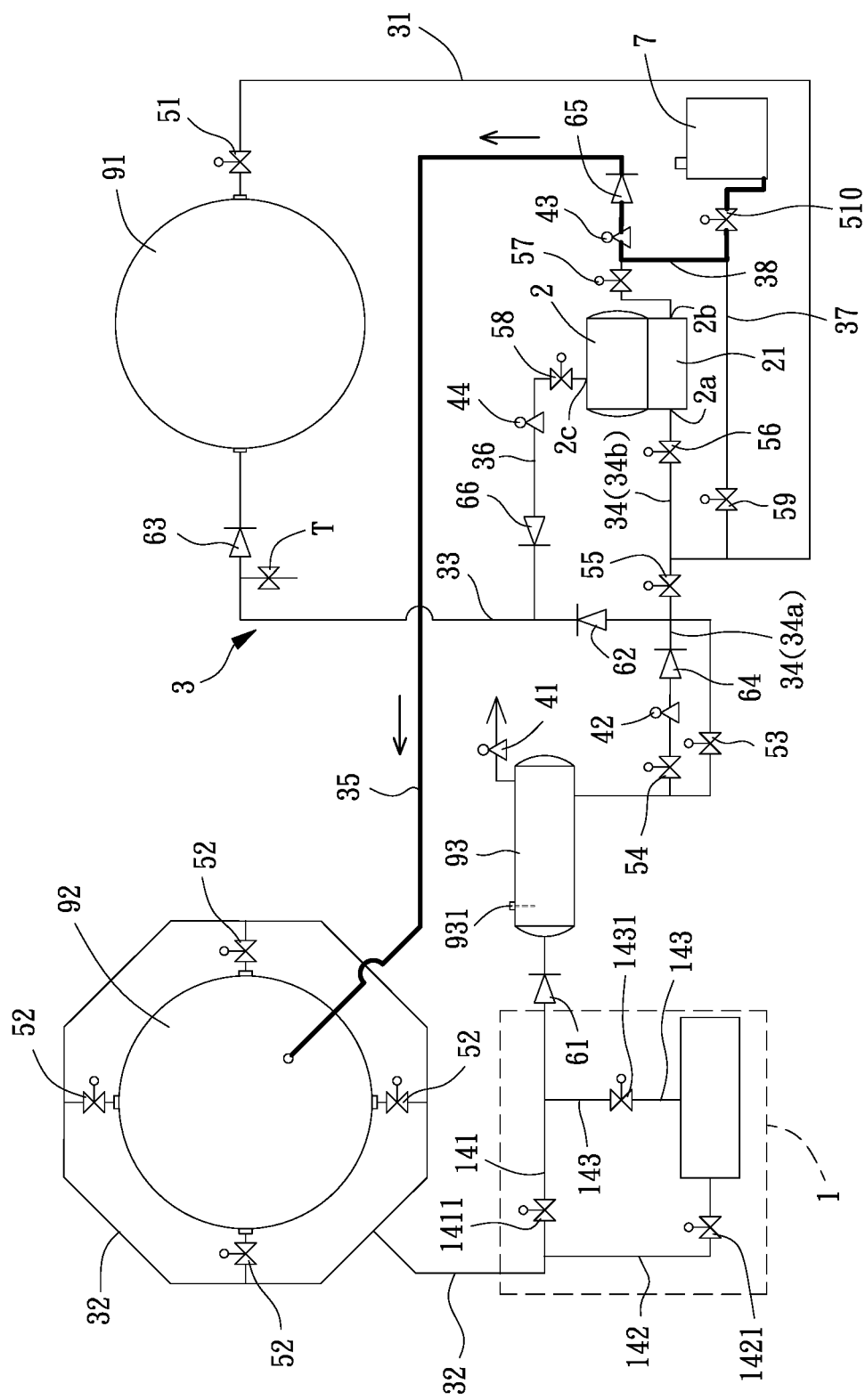
FIG. 10 is a schematic diagram illustrating the sixth kind of cleaning operation of the equipment shown in FIG. 2.

With reference to FIG. 10, the first step is firstly explained. The supply equipment 7 is used to supply diesel fuel as the carrier. Before carrying out the first step, each second control valve 52 is closed. Under the suction action of the third pump 43, the diesel fuel passes through the seventh pipe 37, the tenth control valve 510, the eighth pipe 38, the third pump 43, and the fifth one-way valve 65 and is filled into the to-be-treated oil tank 92 via the spraying head at the output end of the fifth pipe 35. When a desired amount of diesel fuel is supplied into the to-be-treated oil tank 92, the tenth control valve 510 is closed.

With reference to FIG. 5, in the operation of the second step, the air in the temporary storage tank 93 is sucked out by the first pump 41 to maintain a negative pressure state, such that the diesel fuel mixture in the to-be-treated oil tank 92 can be carried outward from the opened second control valve 52 and pass through the connecting pipe 141, the switch valve 1411, and the first one-way valve 61 and enter the temporary storage tank 93. Under the suction action of the third pump 43, the fuel diesel mixture passes through the third pipe 33, the third control valve 53, the rear fourth pipe 34*b*, the fifth control valve 55, and the sixth control valve 56 and enters the collecting tank 2. Since the heater 21 is activated, the diesel fuel mixture is heated to a temperature of about 60° C. and becomes a fluid with good fluidity, and the dissolved, excellently fluidic laundry detergent carrier circulates through the fifth pipe 35 and the seventh control valve 57. Under the pressurization by the third pump 43, the laundry detergent carrier passes through the fifth one-way valve 65 and is sprayed inward from the top portion of the to-be-treated oil tank 92 via the spraying head at the output end of the fifth pipe 35, thereby repeatedly heating and flushing/dissolving the oil sludge in the to-be-treated oil tank 92.

After the above repeated heating and flushing/dissolving the oil sludge in the to-be-treated oil tank 92 storing crude oil, the third step is carried out. As shown in FIG. 7, the oil sludge mixture can pass through the feeding pipe 142 and the switch valve 1421 and enter the separation equipment 1 for multi-stage circulating separation treatment. As shown in FIG. 8, the clarified liquid after the multi-stage circulating separation treatment by the separation equipment 1 is recycled to meet the concept of environmental protection while increasing the revenue.

With reference to FIG. 10, since each second control valve 52 in the to-be-treated oil tank 92 is spaced from the oil tank bottom, each of the above cleaning methods cannot clean and remove the oil sludge accumulated below each second control valve 52. The oil tank cleaning device according to the present disclosure can use water supplied from the supply equipment 7 as the carrier. Under the suction action of the third pump 43, the water carrier passes through the seventh pipe 37, the tenth control valve 510, the eighth pipe 38, the third pump 43, and the fifth one-way valve 65 and is filled into the to-be-treated oil tank 92 via the spraying head at the output end of the fifth pipe 35, such that the oil sludge on the inner wall of the to-be-treated oil tank 92 and below each second control valve 52 is flushed/dissolved and washed, thereby forming, from top to bottom in sequence, an oil layer, a water layer, and a sand layer.

With reference to FIG. 5, after a proper amount of water is filled into the to-be-treated oil tank 92, the tenth control valve 510 is closed. The oil/water mixture flows through the second control valve 52, passes through the connecting pipe 141, the switch valve 1411, and the first one-way valve 61 and enters the temporary storage tank 93. Under the suction action of the third pump 43, the oil/water mixture passes through the third control valve 53 on the third pipe 33 and the fifth and sixth control valves 55 and 56 on the rear fourth pipe 34*b*, and enters the collecting tank 2. Since the heater 21 is activated, the oil/water mixture is heated, the heated oil/water mixture circulates along the fifth pipe 35 to pass through the seventh control valve 57, the third pump 43, the fifth one-way valve 65 and is sprayed into the to-be-treated oil tank 92 again via the spraying head at the output end of the fifth pipe 35. After repeated processing, the oil layer, the water layer, and the sand layer in the to-be-treated oil tank 92 can become homogeneous under heating and flushing/dissolving.

With reference to FIG. 7, since the oil layer is lighter than the water layer, the oil layer floats on the water layer. When the bottom portion of the oil layer is higher than each second control valve 52 on the to-be-treated oil tank 92, the separation equipment 1 can perform the separation operation of oil, water, and sand. Specifically, the switch valve 1411 is closed, such that the mixture of oil, water, and sand are carried outward to pass through the feeding pipe 142 and the switch valve 1421 and enter the separation equipment 1 for multi-stage circulating separation treatment. After cyclone separation of the oil sludge mixture, the solid matters after separation can fall from the bottom. The clarified liquid (oil) passes through the discharge pipe 143, the switch valve 1431, the connecting pipe 141, and the first one-way valve 61 and enters the temporary storage tank 93. Then, the clarified liquid passes through the third pipe 33, the third control valve 53, the rear fourth pipe 34b, the fifth control valve 55, and the sixth control valve 56 and is heated by the heater 21. The heated clarified liquid circulates along the fifth pipe 35 to pass through the seventh control valve 57. Under the suction action and pressurization by the third pump 43, the clarified liquid passes through the fifth one-way valve 65 and is filled into the to-be-treated oil tank 92 again via the spraying head at the output end of the fifth pipe 35. Repeated processing can be performed to flush/dissolve and carry the oil sludge in the to-be-treated oil tank 92.

Figure 11:
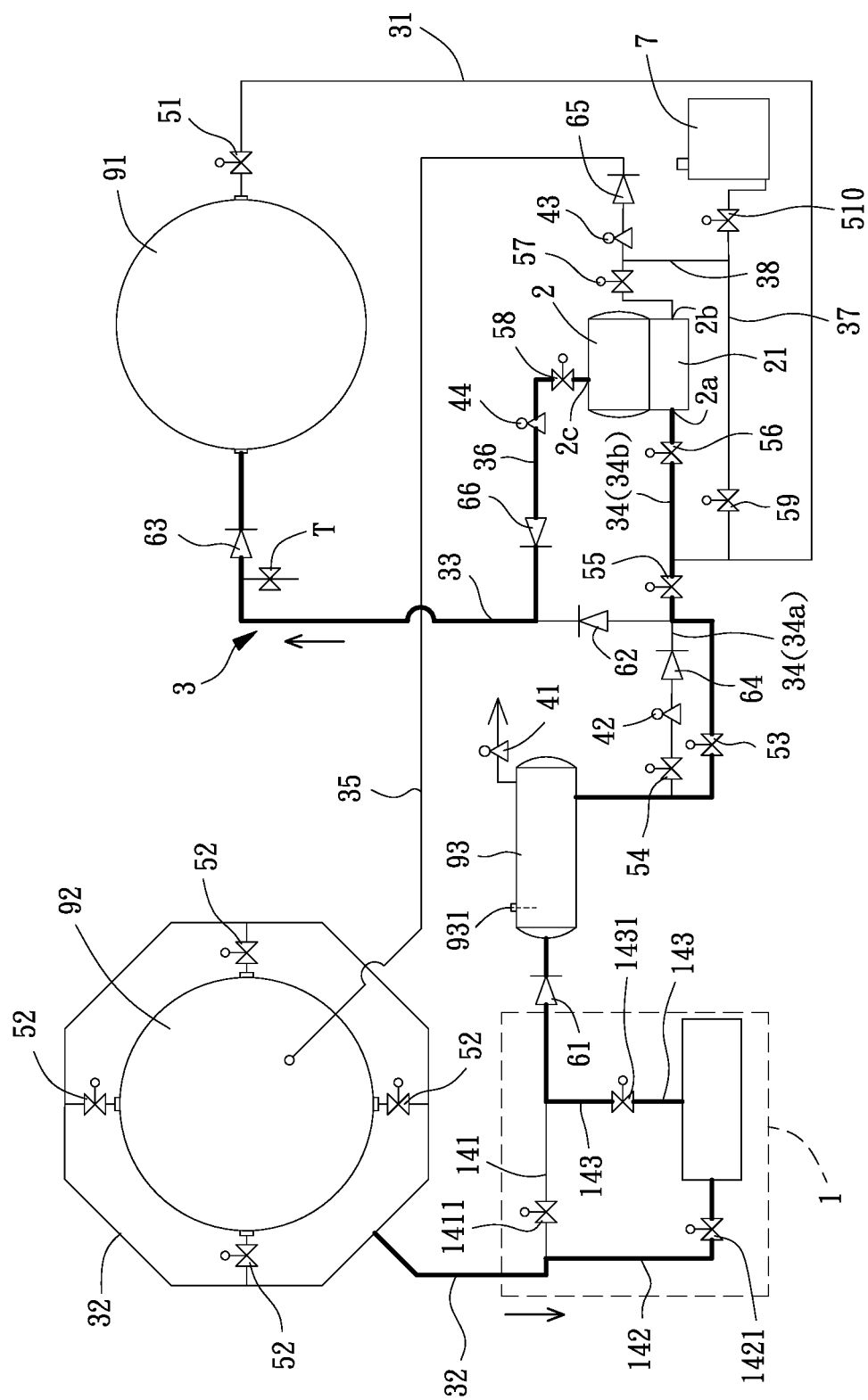
FIG. 11 is a schematic diagram illustrating the seventh kind of cleaning operation of the equipment shown in FIG. 2.

With reference to FIG. 11, after the oil layer above the second control valves 52 is completely removed, the seventh control valve 57 can be closed and the eighth control valve 58 can be opened to change the path of the clarified liquid. Specifically, the first pump 41 sucks air out of the temporary storage tank 93 to maintain a negative pressure state, the clarified liquid entering the temporary storage tank 93 passes through the third pipe 33, the third control valve 53, the rear fourth pipe 34b, the fifth control valve 55, and the sixth control valve 56 and enters the collecting tank 2 for oil/water separation. After the oil/water separation, the clarified liquid passes through the second output end 2c of the collecting tank 2, the sixth pipe 36, and the eighth control valve 58. Under the suction action and pressurization by the fourth pump 44, the clarified liquid passes through the sixth one-way valve 66, the third pipe 33, the inspection valve T, and the third one-way valve 63 and enters the oil supply tank 91, recycling and reusing the treated clarified liquid.

In summary, the oil tank cleaning device according to the present disclosure can perform cleaning operation without requiring a person to enter the oil tank, thereby avoiding accidents. Furthermore, the oil tank cleaning device permits circulation of the carrier to repeatedly clean the to-be-treated oil tank by arrangement of the pipes, which can reliably remove the oil sludge in the oil tank. Furthermore, after separation treatment of the oil sludge, the treated clarified liquid can be recycled, which meets the concept of environmental protection, avoids waste of oil resource, and increases the revenue.

Although the present invention has been described with respect to the above preferred embodiments, these embodiments are not intended to restrict the present invention. Various changes and modifications on the above embodiments made by any person skilled in the art without departing from the spirit and scope of the present invention are still within the technical category protected by the present invention. Accordingly, the scope of the present invention shall include the literal meaning set forth in the appended claims and all changes which come within the range of equivalency of the claims.

What is claimed is:

1. An oil tank cleaning device comprising:
a separation equipment including a tank, a plurality of cyclones, a plurality of pressurizing pumps, and a pipeline module, wherein the tank includes an upstream end and a downstream end, wherein the tank includes an interior divided by a plurality of partitioning boards into a crude liquid chamber and a plurality of treatment liquid chambers, wherein the crude liquid chamber and the plurality of treatment liquid chambers are arranged from the upstream end towards the downstream end, wherein each of the plurality of cyclones includes at least one discharge port and at least one return port, wherein the discharge ports of the plurality of cyclones intercommunicate with the plurality of treatment liquid chambers, respectively, wherein the pipeline module is connected to the tank, the plurality of cyclones, and the plurality of pressurizing pumps, wherein a respective pressurizing pump closer to the upstream end pumps a fluid in the tank into an associated cyclone to urge a fluid with a relatively larger specific gravity to flow through the discharge port of the associated cyclone into an associated treatment liquid chamber, and the fluid with the relatively larger specific gravity is pumped by a next pressurizing pump to a next cyclone, thereby successively delivering the fluid with the relatively larger specific gravity towards the downstream end, and wherein a fluid with a relatively smaller specific gravity flows through the return port of the associated cyclone towards the upstream end and into the tank for continuous circulation;
a temporary storage tank, wherein a first pump sucks air out of the temporary storage tank, such that the temporary storage tank is in a negative pressure state;
a collecting tank configured to receive a fluid outputted from the temporary storage tank;
a pipeline unit including a plurality of pipes for intercommunicating with an oil supply tank, a to-be-treated oil tank, the temporary storage tank, the separation equipment, and the collecting tank; and
a plurality of control valves, wherein each of the plurality of pipes includes at least one of the plurality of control valves, and wherein each control valve is configured to control flow of a liquid in the control valve.

2. The oil tank cleaning device as claimed in claim 1, wherein the collecting tank further includes a heater configured to heat the fluid flowing through the collecting tank.

3. The oil tank cleaning device as claimed in claim 2, wherein a heating temperature of the heater is about 60° C.

4. The oil tank cleaning device as claimed in claim 1, wherein the pipeline unit includes a first pipe for outputting a liquid in the oil supply tank; a second pipe connected to the to-be-treated oil tank and an input end of a connecting pipe of the separation equipment; a feeding pipe including an end connected between an input end of the connecting pipe and a switch valve on the connecting pipe and another end connected to the crude liquid chamber of the separation equipment; a third pipe connected to an outlet of the temporary storage tank and the oil supply tank; a fourth pipe connected to the third pipe and an input end of the collecting tank, wherein an intermediate section of the fourth pipe is connected to the third pipe for a second intercommunication, such that a front fourth pipe is formed between a first intercommunication and the second intercommunication of the fourth pipe, and a rear fourth pipe is formed between the second intercommunication and the collecting tank; a fifth pipe connected to a first output end of the collecting tank for delivering the fluid to the to-be-treated oil tank; a discharge pipe having an end connected to a section of the connecting pipe between the switch valve and a one-way valve and another end connected to a first treatment liquid chamber; and a sixth pipe connected to a second output end of the collecting tank and the third pipe.

5. The oil tank cleaning device as claimed in claim 4, further comprising a second pump disposed on the front fourth pipe, a third pump disposed on the fifth pipe, and a fourth pump disposed on the sixth pipe.

6. The oil tank cleaning device as claimed in claim 4, wherein the at least one control valve includes a first control valve disposed on the first pipe, at least one second control valve configured to control discharge of the liquid in the to-be-treated oil tank, the switch valve disposed on the connecting pipe, a third control valve disposed on the third pipe, a fourth control valve disposed on the front fourth pipe, a fifth control valve and a sixth control valve disposed on the rear fourth pipe, a seventh control valve disposed on the fifth pipe, a switch valve disposed on the discharge pipe, and an eighth control valve disposed on the sixth pipe.

7. The oil tank cleaning device as claimed in claim 6, wherein an output end of the first pipe is connected to the rear fourth pipe and is located between the fifth control valve and the sixth control valve.

8. The oil tank cleaning device as claimed in claim 4, further comprising a supply equipment, wherein the pipeline unit further includes a seventh pipe connected to the first pipe and the supply equipment, and an eighth pipe connected to the seventh pipe and the fifth pipe.

9. The oil tank cleaning device as claimed in claim 8, wherein the seventh pipe includes a ninth control valve and a tenth control valve.

10. The oil tank cleaning device as claimed in claim 9, wherein an end of the eighth pipe is connected to a section of the fifth pipe between the seventh control valve and a third pump, and wherein another end of the eighth pipe is connected to a section of the seventh pipe between the ninth control valve and the tenth control valve.

* * * * *